United States Patent
Kerns et al.

(10) Patent No.: US 6,923,652 B2
(45) Date of Patent: Aug. 2, 2005

(54) NONVERBAL COMMUNICATION DEVICE AND METHOD

(76) Inventors: Roger Edward Kerns, 33881 Copper Lantern #D, Dana Point, CA (US) 92629; Russell Eugene Miller, 946 Avenida Carmel, Unit D, Laguna Woods, CA (US) 92653

(\*) Notice: Subject to any disclaimer, the term of this patent is extended or adjusted under 35 U.S.C. 154(b) by 0 days.

(21) Appl. No.: 10/081,027

(22) Filed: Feb. 21, 2002

(65) Prior Publication Data

US 2003/0157465 A1 Aug. 21, 2003

(51) Int. Cl.[7] ............................................. G09B 21/00
(52) U.S. Cl. .......................... 434/112; 434/236; 434/262
(58) Field of Search .................................. 434/112, 236, 434/262, 20, 307 R; 600/300

(56) References Cited

U.S. PATENT DOCUMENTS

| 4,306,368 | A |  | 12/1981 | Coghill et al. |
| 4,444,520 | A | * | 4/1984 | Hanakata et al. ............. 400/88 |
| 4,954,083 | A |  | 9/1990 | Leff et al. |
| 5,100,328 | A | * | 3/1992 | Badgley ...................... 434/308 |
| 5,142,655 | A | * | 8/1992 | Drumm ........................ 379/52 |
| 5,191,411 | A | * | 3/1993 | Muckerheide ............... 348/61 |
| 5,255,167 | A | * | 10/1993 | Toussaint et al. ........... 362/103 |
| 5,517,021 | A | * | 5/1996 | Kaufman et al. ........... 250/221 |
| 5,580,254 | A |  | 12/1996 | Ramsey |
| 5,954,674 | A | * | 9/1999 | Fuhr ........................... 600/594 |
| 5,991,085 | A | * | 11/1999 | Rallison et al. ............. 359/630 |
| 6,056,549 | A |  | 5/2000 | Fletcher |
| 6,115,482 | A | * | 9/2000 | Sears et al. .................. 382/114 |
| 6,363,648 | B1 | * | 4/2002 | Kranich et al. ............... 42/117 |
| 6,505,776 | B1 | * | 1/2003 | Wilz et al. ............. 235/462.01 |
| 6,513,251 | B2 | * | 2/2003 | Huang et al. .................. 33/286 |

\* cited by examiner

*Primary Examiner*—Chanda L. Harris
*Assistant Examiner*—John Sotomayor
(74) *Attorney, Agent, or Firm*—Knobbe Martens Olson & Bear, LLP (57) ABSTRACT

This invention discloses a communication device to facilitate the communication abilities of speech-impaired individuals. In particular, the communication device is designed to offer those speech-impaired individuals with limited manual motor capacities the ability to communicate quickly and unambiguously.

6 Claims, 8 Drawing Sheets

A B C D E F G H
I J K L M N O P
Q R S T U V W X
Y Z / ? ! .
NEW WORD
YES NO DONE
1 2 3 4 5 6 7 8 9 0

GO TO TOILET

GO TO BED     I AM COLD

NEED MY MEDS    NEED MY SHOT    I NEED WATER    I NEED WATER

PUT ME IN CHAIR    GO TO BED    I AM HUNGRY    I WANT COFFEE

LISTEN TO RADIO    PLEASE CALL?    READ TO ME    I WANT TO WATCH TV

GO TO TOILET    I NEED A BATH    TAKE ME TO CHAIR    TAKE ME TO SOFA

NEED TO BRUSH TEETH    I NEED TO SHAVE    BRUSH MY HAIR

NONVERBAL COMMUNICATION DEVICE AND METHOD

BACKGROUND OF THE INVENTION

1. Field of the Invention

This invention relates to a communication device to facilitate the communication abilities of speech-impaired individuals. In particular, the communication device is designed to offer those speech-impaired individuals with limited manual motor capacities the ability to communicate quickly and unambiguously.

2. Description of the Related Art

Communication between a speech-impaired individual and someone without this handicap is generally difficult and frustrating for both parties. Communication must be quick and accurate to avoid frustration on the part of the communicating parties. While sign language satisfy both of these requirements, it presents other disadvantages. Like any language it has a learning curve and is thus more suited for speech-impaired individuals who has had this impediment since an early age. Also, it requires learning on the part of the non-handicapped person or an interpreter. Lastly, speech-impaired individuals with limited manual motor capacities, such as amyotrophic lateral sclerosis (ALS or Lou Gehrig's disease) patients, may not be capable of the vigorous gesturing involved in sign language.

There are several devices on the market to facilitate communication by a speech-impaired individual but they all fall short in terms of either quickness or accuracy. One device in the prior art has the user arranging tiles with symbols into a pictorial sentence. Such a device presents an inevitable tradeoff between quickness and accuracy; a small set of tiles would not adequately portray many concepts, while a large set of tiles would be cumbersome to manipulate. Also, speech-impaired individuals with limited manual motor capacities may lack the dexterity to use this device.

Another device has the symbols arranged in a circle with a pointer projecting from the center of the circle. A lever controlling a ratcheting mechanism moves the pointer to the next symbol in either a clockwise or anti-clockwise direction. However, the same limiting tradeoff between quickness and accuracy is readily discernible in this setup.

Yet another communication device has an aperture through which an observer can follow the eye movement of a speech-impaired individual to determine a symbol or an alphabet on a chart that the latter is viewing. This method is prone to observer error and thus unreliable. Also, this device allows the speech-impaired individual to communicate with only one other person.

The ALS society has a laptop computer with an input device that detects an ALS patient's eyelid movement. A patient uses this device to manipulate a pointer over a chart displayed on the laptop's screen. Unfortunately this input device has two shortcomings that make it difficult to use. First, its lengthy calibration process means that even a relatively simple communication, such as requesting a sip of water, must be burdened with a huge time overhead. Second, natural movements of the patient's head easily upsets its calibration. As a result, the detection is rather erratic.

Accordingly, there is a need for a communication device for speech-impaired individuals to quickly and accurately communicate their needs and desires. To achieve this end, such a device must be intuitive, both for the speech-impaired individual to use, and for the non-handicapped person to comprehend. There must be no significant time overhead due to calibration. Also, this device must be capable of being operated by those handicapped individuals with limited manual motor capacities to maximize its range of applications. These are the objectives of the present invention.

SUMMARY OF THE INVENTION

The present invention has been developed to address the needs which remain in the art, as discussed above. Specifically, it is directed towards a communication device to facilitate the communication abilities of speech-impaired individuals, including those with limited manual motor capabilities.

The preferred embodiment comprises a light emitting pointer, affixed on an individual and articulated by manual motor movements of said individual to indicate characters and symbols on charts. It can be appreciated that the individual may use the communication device to indicate other objects within his field of vision. Preferably, the light emitting pointer is a Class II laser pointer, as Class II lasers are exempt from control measures. Ideally the laser pointer is attached to an arm of the eyeglasses frame worn by the individual, with a wire running to a separate power compartment to minimize the mass that has to be articulated by the individual. The individual can thus intuitively aim the pointer with slight movements of his head. Alternatively the pointer may be affixed to other body parts over which the individual has manual motor control, via items such as hats, rings and wristbands. The pointer is usually articulated via the user's body movements at a point proximal to the point of attachment of the pointer, where proximal means closer to the center of the user's body.

Multiple charts enable the individual to communicate a full range of concepts. A basic chart with the alphabet and numbers allows the individual to spell out words. Frequent requests such as a drink of water or assistance with toilet use may be included as symbols on this chart for convenience. Another chart with a diagram of the human body can be used by the individual to call attention to parts of his body in communicating with a caregiver. Additional charts tailored to the communicating individual needs can be made and modified on an ad hoc basis, such as one covering the individual's dietary and medicinal needs. The symbols are labeled to allow unambiguous communication.

The communication device as disclosed in certain embodiments allows a speech-impaired individual to communicate quickly and accurately with multiple persons. The device and its method of use is intuitive to use and understand. It presents no calibration issues. Furthermore, the device may be cheaply manufactured from readily available components. For speech-impaired individuals with limited manual motor capabilities this device is particularly advantageous as it requires only small, natural body movements to articulate.

Although the challenges facing a speech-impaired individual have thus far been used as examples, there are other analogous situations in which communication via regular speech present difficulties. Examples include communication in noisy environments, with a person who is hard of hearing, and between persons speaking different languages or dialects. These "speech-impaired" situations do not necessarily involve persons with speech impediments or physical handicaps. It can be appreciated that the communication device disclosed in this invention allows quick and unambiguous communication in these "speech-impaired" situations as well.

Advances in electronics and computer technology enable certain embodiments to be adapted for communication between users and other equipment, such as computers or other devices and appliances. This communication allows users to control and operate such other equipment.

Other features and advantages of the present invention will be apparent from the following detailed description taken in conjunction with the accompanying drawings, which illustrate, by way of example, the principles of the invention.

DETAILED DESCRIPTION OF THE PREFERRED EMBODIMENTS

Figure 1A:
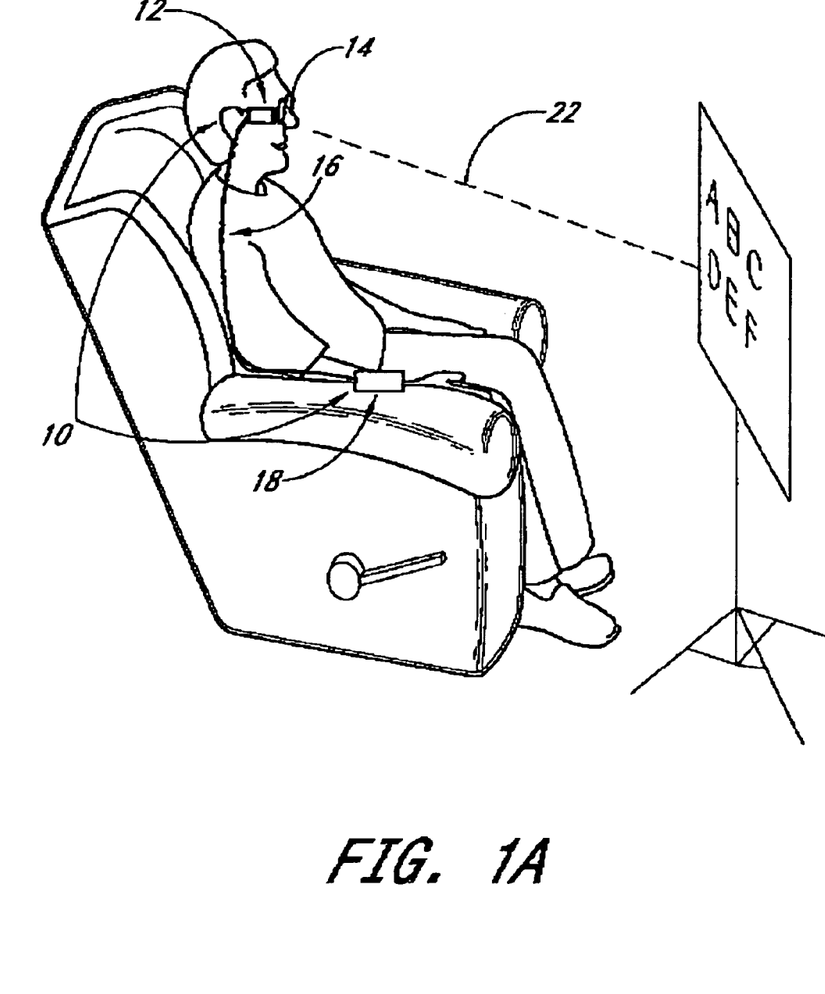
FIGS. 1a and 1b show a user using an embodiment of the nonverbal communication device.
Figure 1B:
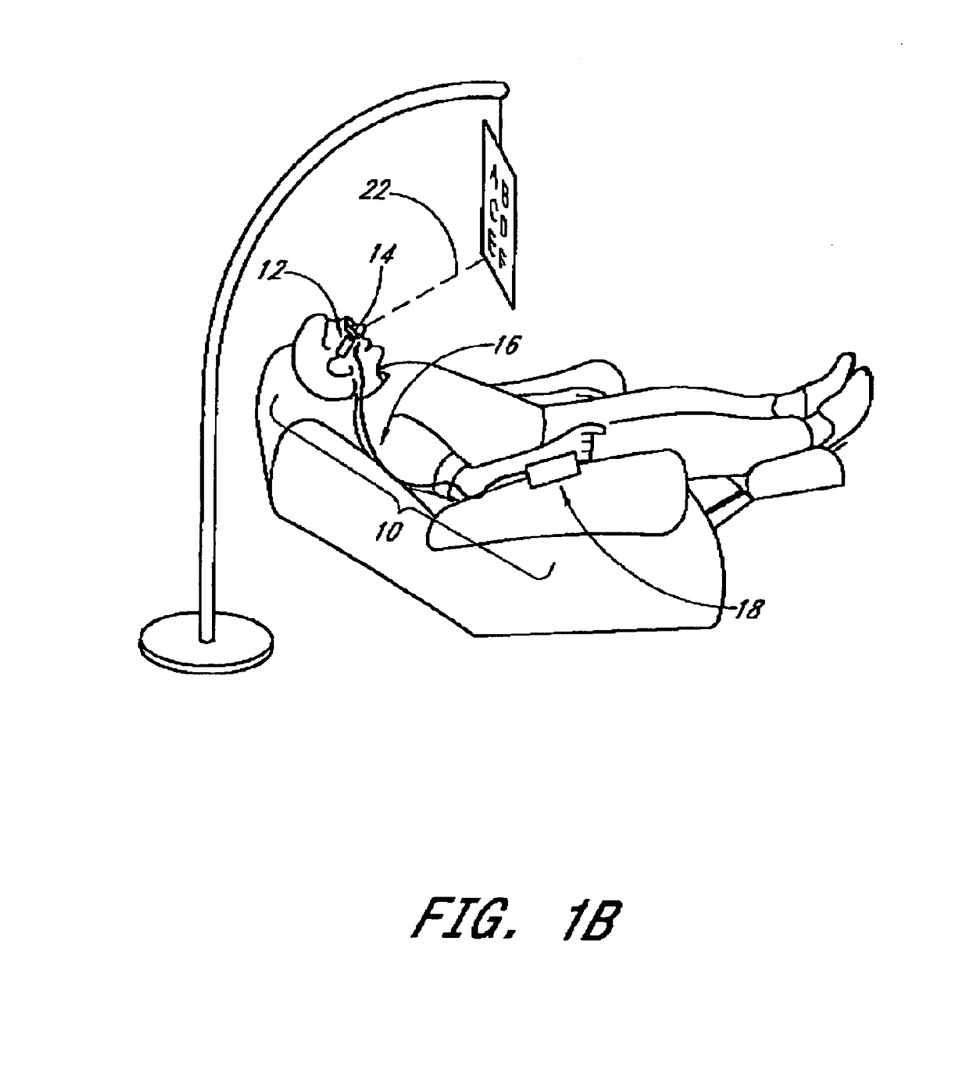

The method of using a communication device constructed in accordance with an embodiment of the present invention is shown in FIGS. 1a and 1b of the drawings. This communication device 10 comprises a laser module 12, an attachment device 14 for affixing the laser module on the user, an electric wire 16 leading from the laser module 12 to a power compartment 18 powering the laser module 12. The user aims a laser beam 22 emitted from the laser module 12 via body movements at a character or symbol on a chart 20 to communicate with a viewer.

Figure 2A:
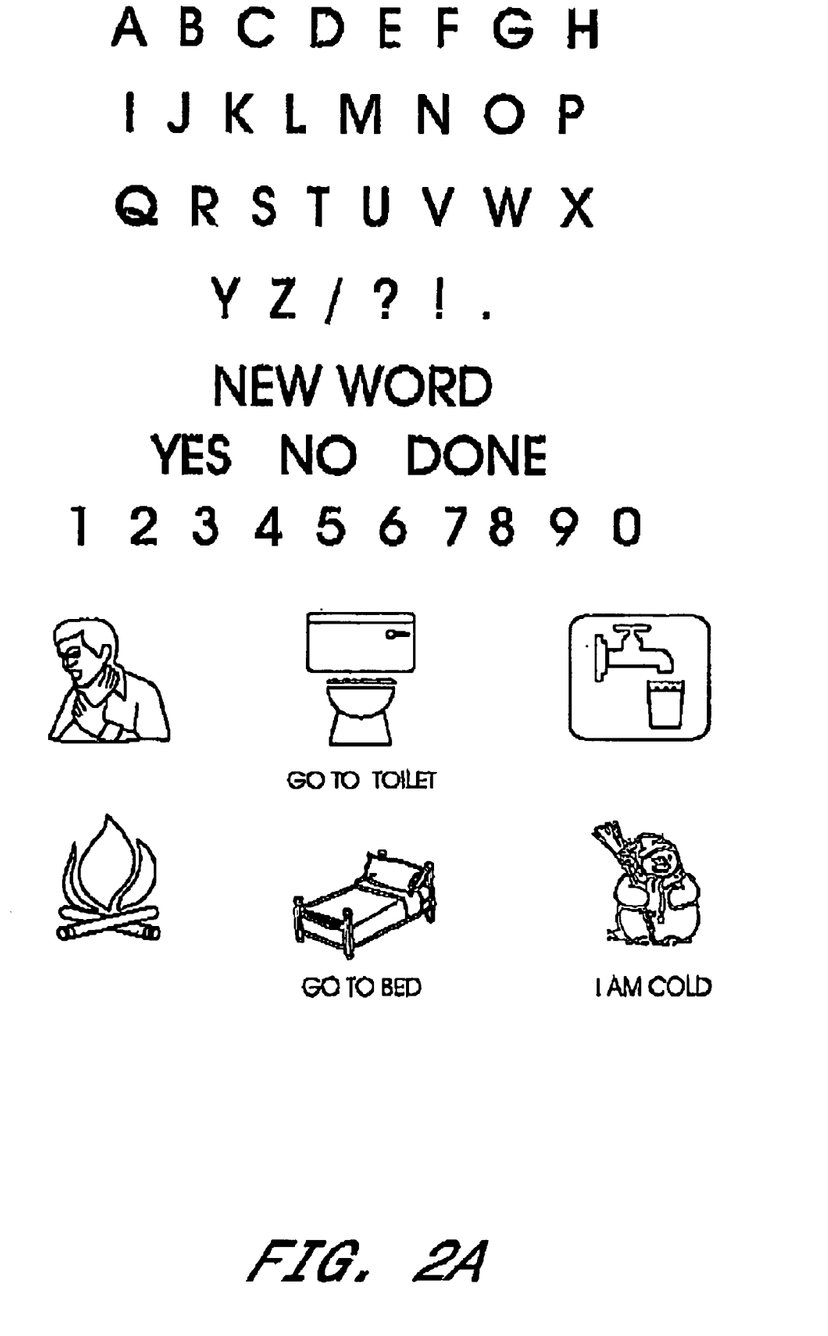
FIG. 2a is a basic chart that may be used with the nonverbal communication device.

FIG. 2a is an example of the chart 20. It represents a basic chart through which the user can communicate with a viewer. It has alphabetical characters 50 with which the user can spell the words to be communicated to the viewer. It can be appreciated that these alphabetical characters 50 may be arranged in a QWERTY format for users who are familiar with the standard keyboard layout. The alphabetical characters 50 include punctuation. Also included on this chart is a label "NEW WORD" 52 that the user can point at to indicate the space or break between two words. Frequently used words 54, such as "YES", "NO", "DONE" and numerical characters 56 are also included on this chart. Frequent communications, such as requests for water or assistance with toilet use can also be included as symbols 58 on this chart for convenience.

Figure 2B:
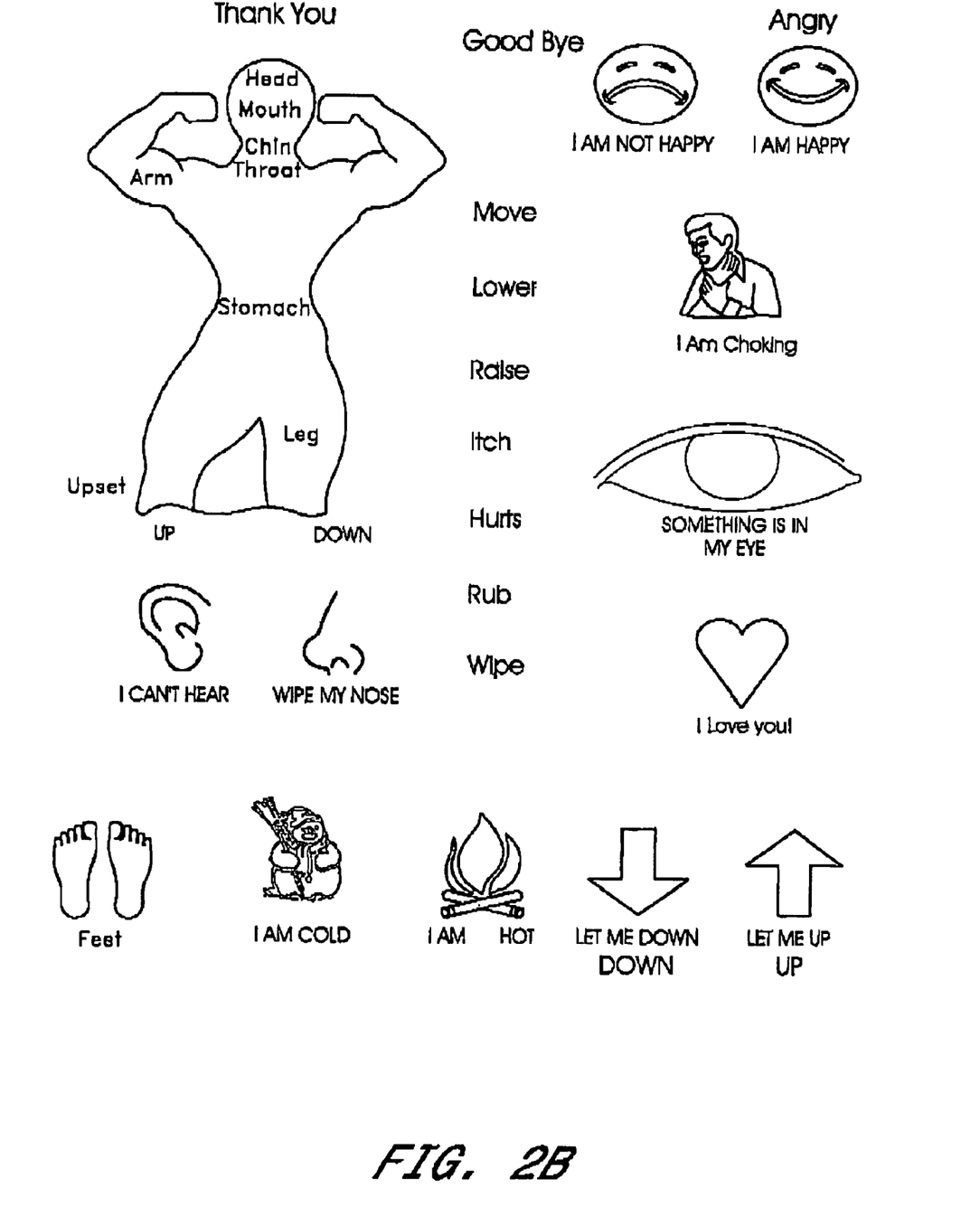
FIGS. 2b and 2c are other examples of charts that may be used with the nonverbal communication device.
Figure 2C:
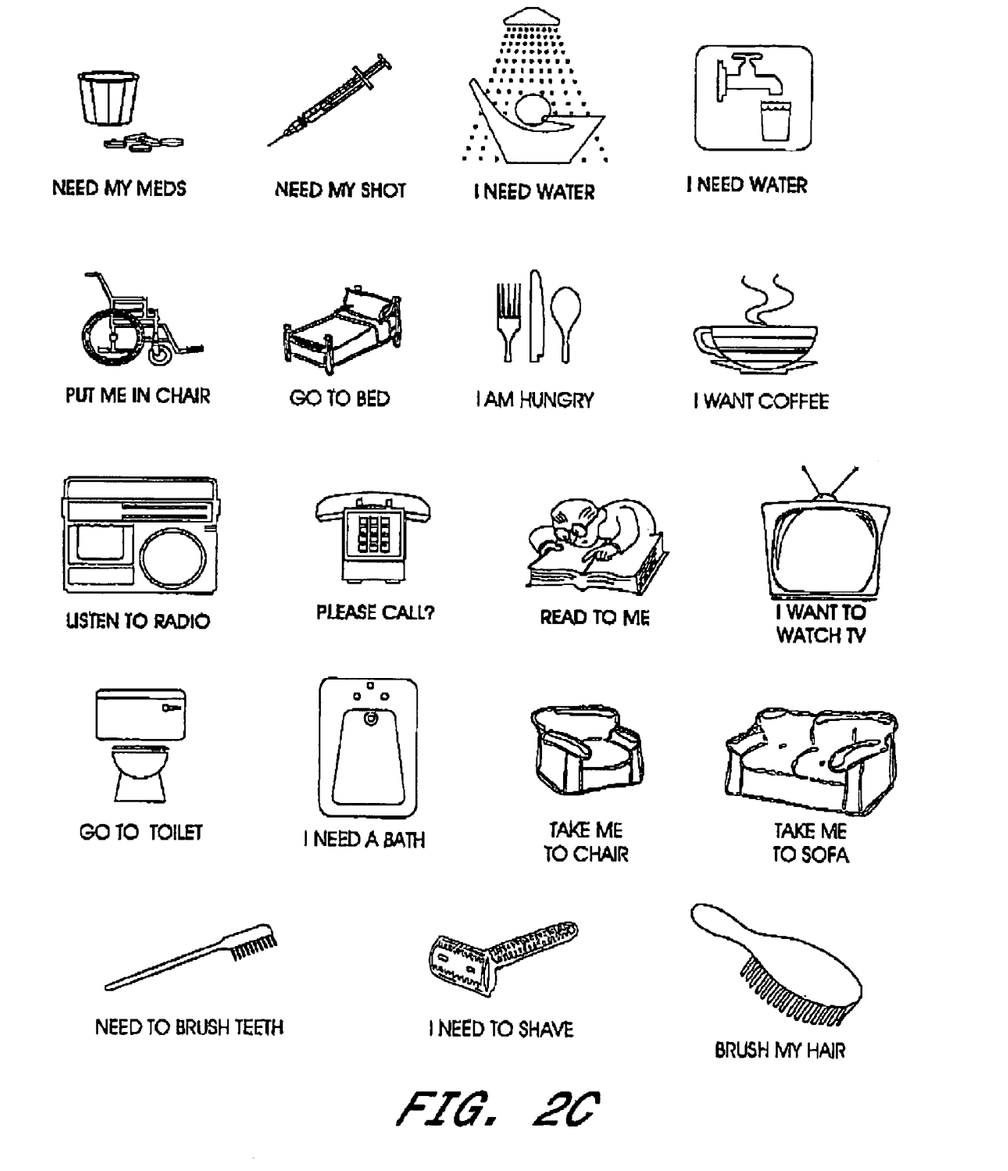

FIGS. 2b and 2c are other examples of chart 20. These include more symbols representing frequent communications, and a diagram of the human body 60 for the user to call attention to parts of his body in communicating with a caregiver. The symbols are also labeled with labels 62 in plain English to allow unambiguous communication, even with viewers who are not too familiar with the method of using the communication device 10. It can be appreciated that more than one of these charts 20 may be displayed before the user to allow him the broadest range of communication.

Figure 3:
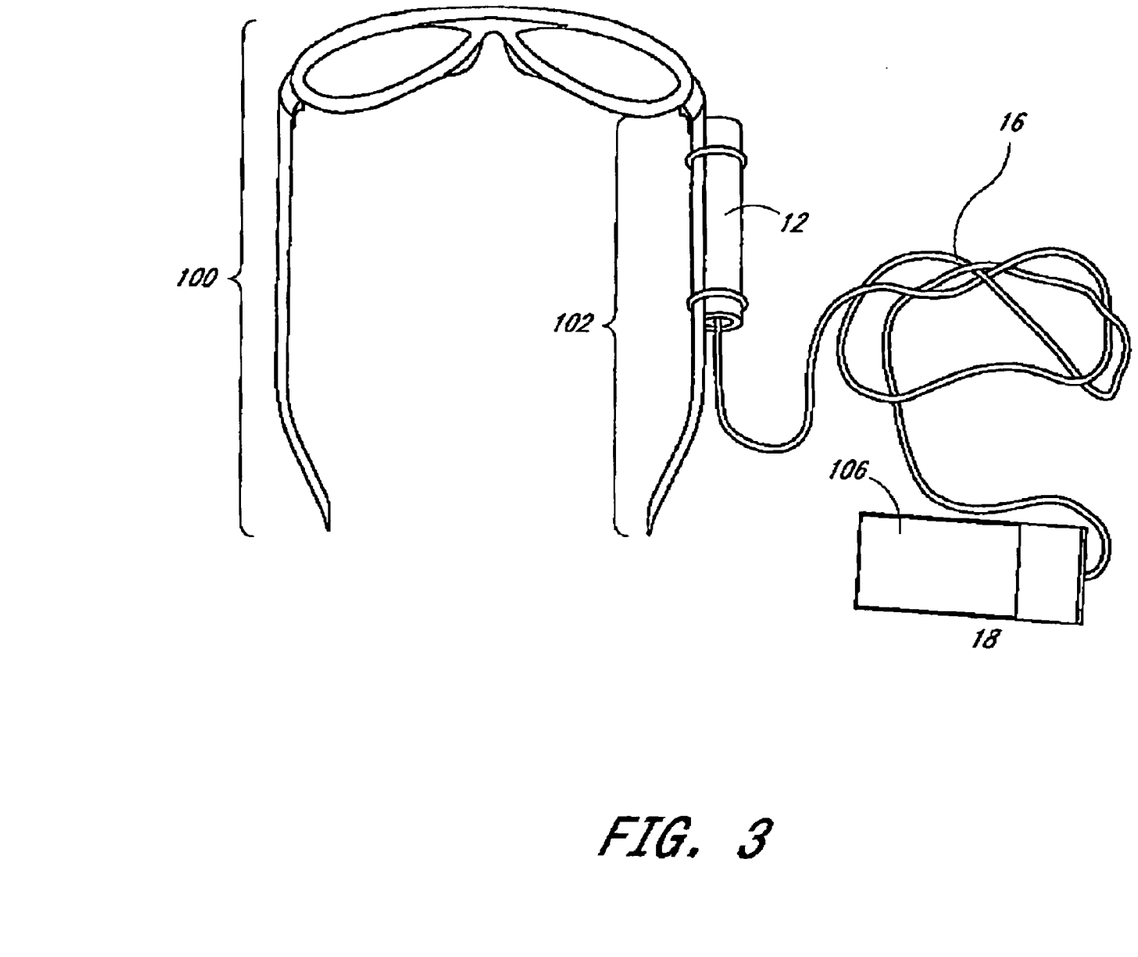
FIG. 3 shows in detail the preferred embodiment of the nonverbal communication device, without the user.

FIG. 3 shows the part of the communication device 10 worn by the user. A laser module 12 is affixed to the user by an attachment device 14. Preferably a class II laser diode is used in the laser module 12 as Class II lasers are exempt from control measures. The preferred attachment device 14 are the user's eyeglasses 100. The laser module 12 is reversibly secured to an arm 102 of the user's eyeglasses 100 via O-rings 104 or other means. A power compartment 18 powers the laser module 12 via an electric wire 16. Preferably the power compartment 18 is not secured to the attachment device 14, in order to minimize the mass that has to be articulated by the user. Also a warning label 106 regarding eye damage due to prolonged direct viewing of the laser may be placed on the power compartment 18. It can be appreciated that other attachment devices not shown here, for example, a wristband, a ring, or a hat, would just as easily allow the practice of this invention.

Figure 4:
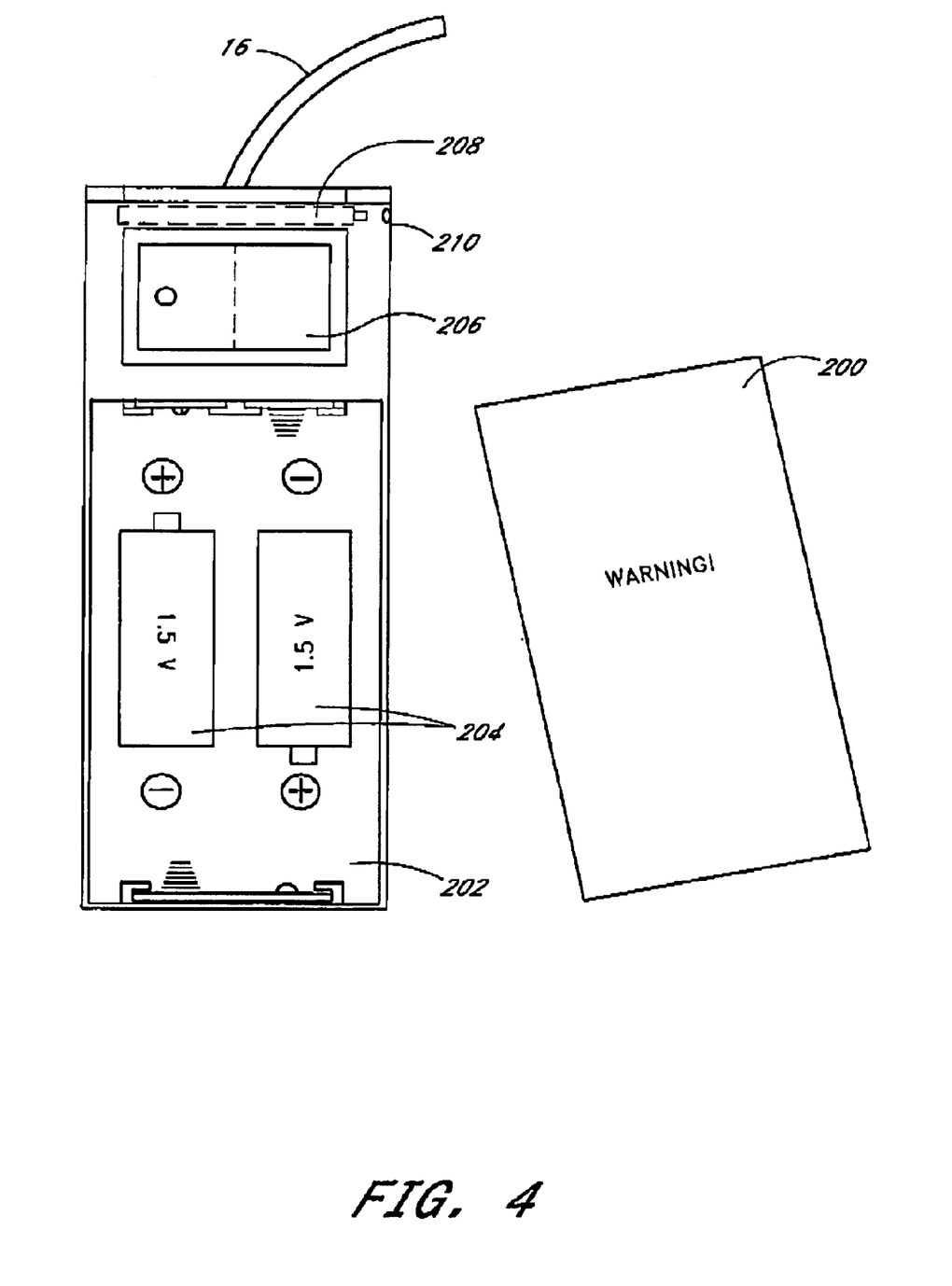
FIG. 4 shows an embodiment of the power compartment of the nonverbal communication device.
Figure 5:
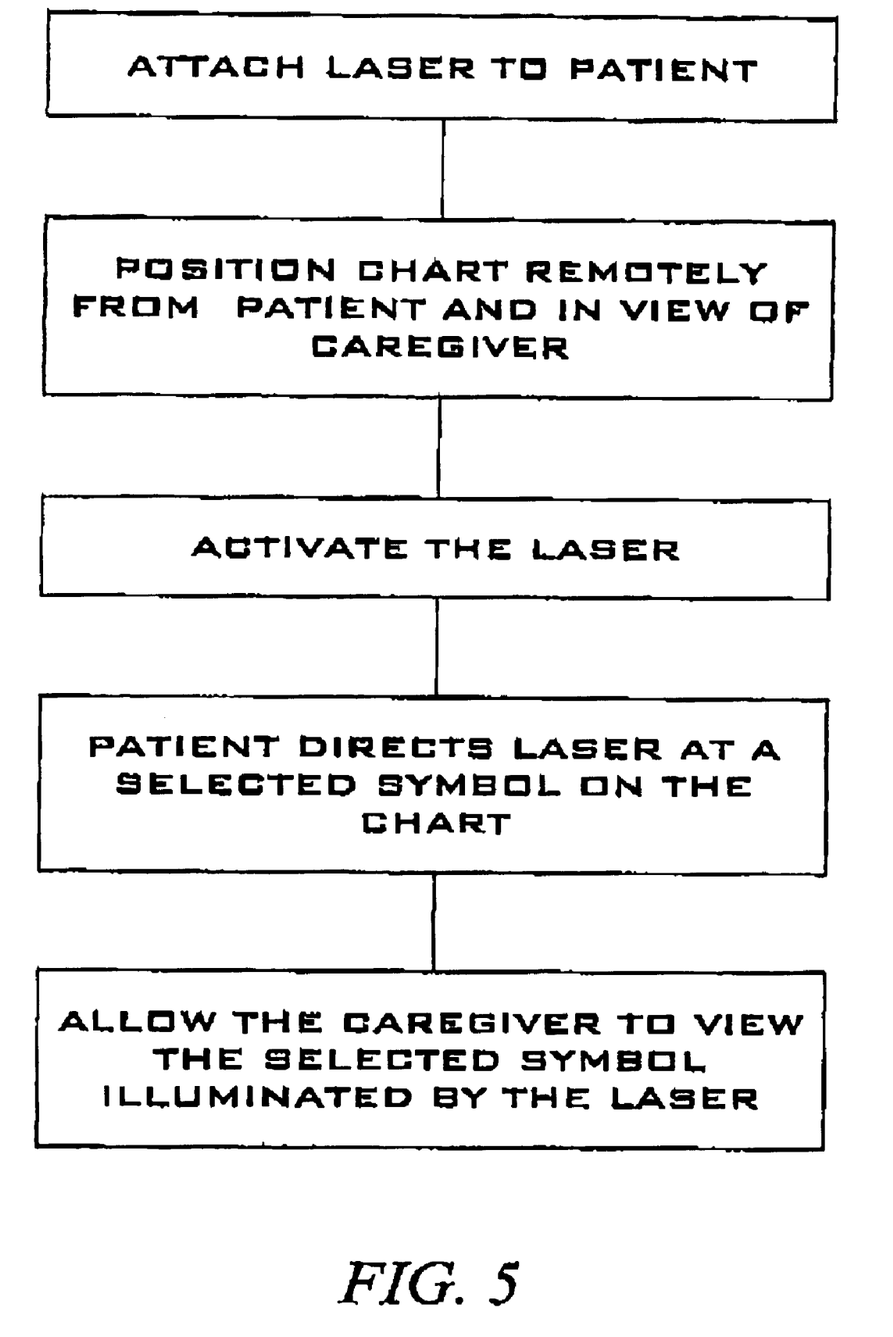
FIG. 5 is a schematic flow chart of one embodiment of a method of non-verbal communication.

FIG. 4 is an embodiment of the power compartment 18. The internal schematic view of the power compartment 18 is shown, with the battery cover 200 removed. Alternatively, a hinged battery cover attached to the power compartment 18 may be used. The battery cover 200 covers a battery housing 202 which houses one or more batteries 204. Preferably two AA or two AAA batteries connected in series are used to provide the ideal voltage of 3V. Operating the laser module 12 at 3V puts it well within the 1 mW limit of class II laser devices. The power compartment 18 also comprises a power switch 206 and an optional dimmer control 208 to regulate the brightness of the laser. Both power switches and dimmer switches are simple electric devices well known in the prior art. Preferably the dimmer control 208 is accessible only via a small opening 210 to prevent accidental adjustments of the brightness of the laser.

While embodiments and applications of this invention have been shown and described, it will be apparent to those skilled in the art that various modifications are possible without departing from the scope of the invention. It is, therefor, to be understood that within the scope of the appended claims and their equivalents, this invention may be practiced otherwise than as specifically described above.

What is claimed is:

1. A method of nonverbal communication between a patient and a caregiver, the method comprising:

removably securing a laser to an article worn by the patient, the laser being coupled to a power supply and an on/off switch, providing a plurality of charts at a location remote from, but within view of the patient, each chart comprising a plurality of both alphanumeric and graphical images permanently printed thereon, wherein the charts do no require electrical power to retain the images, wherein the graphical images are selected to represent at least one concept selected from the group consisting of: pain, discomfort, emotion, personal grooming requests and information relating to a medical condition of the personal grooming requests and information relating to a medical condition of the patient, wherein the images are grouped according to said concept, and wherein a plurality of images indicating related concepts are located adjacent one another on the chart;

placing the charts within view of both the patient and the caregiver;

activating the laser by operating the switch;

selecting a first chart and a first image and aiming a laser beam emitted from said laser at the first image on the first chart, thereby causing a visible laser image to impinge on the chart on or adjacent to the first image;

selecting a second image on the first chart and aiming the laser beam at the second image, thereby causing a visible laser image to impinge on the chart on or adjacent to the second image;

allowing the caregiver to view the chart, the first image and the second image illuminated by the patient, wherein a sequence of selecting the first image and the second image facilitates communication of a concept to the caregiver.

2. The method of claim 1, wherein the first image represents a portion of the patient's body, and wherein the second image represents an action to be performed on the portion of the patient's body represented by the first image.

3. The method of claim 2, wherein the first image represents a patient's nose, and the second image represents a request for the caregiver to scratch the patient's nose.

4. The method of claim 1, further comprising selecting a second chart, and selecting a third image on the second chart.

5. The method of claim 1, wherein each graphical image comprises a textual label or descriptor.

6. The method of claim 1, further comprising varying an intensity of the laser beam with a dimmer.

* * * * *